US009806386B2

(12) United States Patent
Lim

(10) Patent No.: US 9,806,386 B2
(45) Date of Patent: Oct. 31, 2017

(54) BATTERY PACK

(71) Applicants: SAMSUNG SDI CO., LTD., Yongin-si, Gyeonggi-do (KR); ROBERT BOSCH GMBH, Stuttgart (DE)

(72) Inventor: Young-Bin Lim, Yongin-si (KR)

(73) Assignees: Samsung SDI Co., Ltd., Yongin-Si, Gyeonggi-do (KR); Robert Bosch GmbH, Stuttgart (DE)

(*) Notice: Subject to any disclaimer, the term of this patent is extended or adjusted under 35 U.S.C. 154(b) by 663 days.

(21) Appl. No.: 14/146,052

(22) Filed: Jan. 2, 2014

(65) Prior Publication Data

US 2014/0186677 A1    Jul. 3, 2014

(30) Foreign Application Priority Data

Jan. 3, 2013  (KR) .................. 10-2013-0000659

(51) Int. Cl.
*H01M 10/6556* (2014.01)
*H01M 10/6561* (2014.01)
*H01M 10/613* (2014.01)
*H01M 2/10* (2006.01)

(52) U.S. Cl.
CPC ..... *H01M 10/5057* (2013.01); *H01M 10/613* (2015.04); *H01M 10/6556* (2015.04); *H01M 10/6561* (2015.04); *H01M 2/1094* (2013.01)

(58) Field of Classification Search
CPC ............................................... H01M 10/6556
See application file for complete search history.

(56) References Cited

U.S. PATENT DOCUMENTS

| 2004/0180257 A1* | 9/2004 | Kimoto ............... F28D 15/0275 429/120 |
| 2005/0153199 A1* | 7/2005 | Yagi ..................... H01M 2/105 429/148 |
| 2007/0015049 A1* | 1/2007 | Hamada ............. H01M 2/1077 429/120 |
| 2008/0118819 A1* | 5/2008 | Gamboa ............. H01M 2/0245 429/61 |

(Continued)

FOREIGN PATENT DOCUMENTS

JP          2012-38589      2/2012
KR  10 2009-0093852 A     9/2009

(Continued)

OTHER PUBLICATIONS

Korean Office Action dated Mar. 8, 2016.

*Primary Examiner* — Alex Usyatinsky
(74) *Attorney, Agent, or Firm* — Lee & Morse, P.C.

(57) ABSTRACT

A battery pack includes at least one battery module having a plurality of battery cells arranged in one direction, the plurality of battery cells in the at least one battery module being electrically connected to one another, and a housing surrounding the at least one battery module. The housing may include an inlet in a first surface of the housing, the first surface being opposite to a side surface of a battery module at one end of the housing, and an outlet in a second surface of the housing, the second surface being opposite to the inlet. The battery pack may also include a sealing member that extends along an edge portion of the side surface of the battery module at the one end of the housing.

16 Claims, 5 Drawing Sheets

(56) References Cited

U.S. PATENT DOCUMENTS

| | | | |
|---|---|---|---|
| 2009/0181288 A1* | 7/2009 | Sato | H01M 2/1077 |
| | | | 429/57 |
| 2011/0008657 A1 | 1/2011 | Chung et al. | |
| 2013/0143081 A1 | 6/2013 | Watanabe et al. | |
| 2013/0157084 A1* | 6/2013 | Bang | H01M 2/1061 |
| | | | 429/7 |

FOREIGN PATENT DOCUMENTS

| | | |
|---|---|---|
| KR | 10 2011-0059353 A | 6/2011 |
| KR | 10-2012-0137849 | 12/2012 |
| WO | WO/2011/149224 | * 12/2011 |

* cited by examiner

BATTERY PACK

CROSS-REFERENCE TO RELATED APPLICATION

The present application claims priority under 35 U.S.C. §119 to Korean Patent Application No. 10-2013-0000659, filed on Jan. 3, 2013, in the Korean Intellectual Property Office, and entitled: "Battery Pack," which is incorporated by reference herein in its entirety.

BACKGROUND

1. Field

Embodiments relate to a battery pack.

2. Description of the Related Art

Battery cells may be used as energy sources for, e.g., mobile devices, electric vehicles, hybrid vehicles, and the like. The shape of the battery cell may depend on the kind of external device to which the battery cell is applied.

SUMMARY

Embodiments are directed to a battery pack, including at least one battery module having a plurality of battery cells arranged in one direction, the plurality of battery cells in the at least one battery module being electrically connected to one another, and a housing surrounding the at least one battery module. The housing may include an inlet in a first surface of the housing, the first surface being opposite to a side surface of a battery module at one end of the housing, and an outlet in a second surface of the housing, the second surface being opposite to the inlet. The battery pack may further include a sealing member that extends along an edge portion of the side surface of the battery module at the one end of the housing.

The battery module at the one end of the housing may include a side frame on the side surface thereof, and the sealing member may be on the side frame.

The sealing member may be a first sealing member, and the first sealing member may be between the first surface of the housing having the inlet and the battery module at the one end of the housing. A second sealing member may be between adjacent battery modules. A third sealing member may be between the second surface of the housing having the outlet and a battery module at a second end of the housing that is opposite to the one end of the housing.

The second sealing member may be adhered to a first battery module and may be compressed by a second battery module.

The second sealing member may be adhered to the first battery module by an adhesive or a double-faced tape.

The volume of the second sealing member compressed by the second battery module may be about 20% to about 50% of the volume of the second sealing member before the second sealing member is compressed.

The first sealing member may be adhered to the battery module at the one end of the housing and may be compressed by the first surface of the housing. The third sealing member may be adhered to the battery module at the second end of the housing and may be compressed by the second surface of the housing.

The first sealing member may be adhered to the battery module at the one end of the housing by an adhesive or a double-faced tape. The third sealing member may be adhered to the battery module at the second end of the housing by an adhesive or a double-faced tape.

The volume of the first sealing member compressed by the first surface of the housing may be about 20% to about 50% of the volume of the first sealing member before the first sealing member is compressed. The volume of the third sealing member compressed by the second surface of the housing may be about 20% to about 50% of the volume of the third sealing member before the third sealing member is compressed.

The inlet, the first sealing member, the second sealing member, the third sealing member, and the outlet may define an air flow path through the housing.

The sealing member may include a sponge or a rubber.

The sealing member may include ethylene propylene diene monomer rubber.

The sealing member may have a density of about 0.05 $g/cm^3$ to about 0.2 $g/cm^3$.

The inlet, the sealing member, and the outlet may define an air flow path through the housing.

The air flow path may pass through the side surface of the battery module at the one end of the housing.

The at least one battery module may include a plurality of battery modules, and the air flow path may pass through each of the battery modules.

The at least one battery module may include a plurality of battery modules, each of the plurality of battery modules may have a plurality of battery cells arranged in the one direction, and the plurality of battery modules may be arranged in a second direction that is perpendicular to the first direction.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
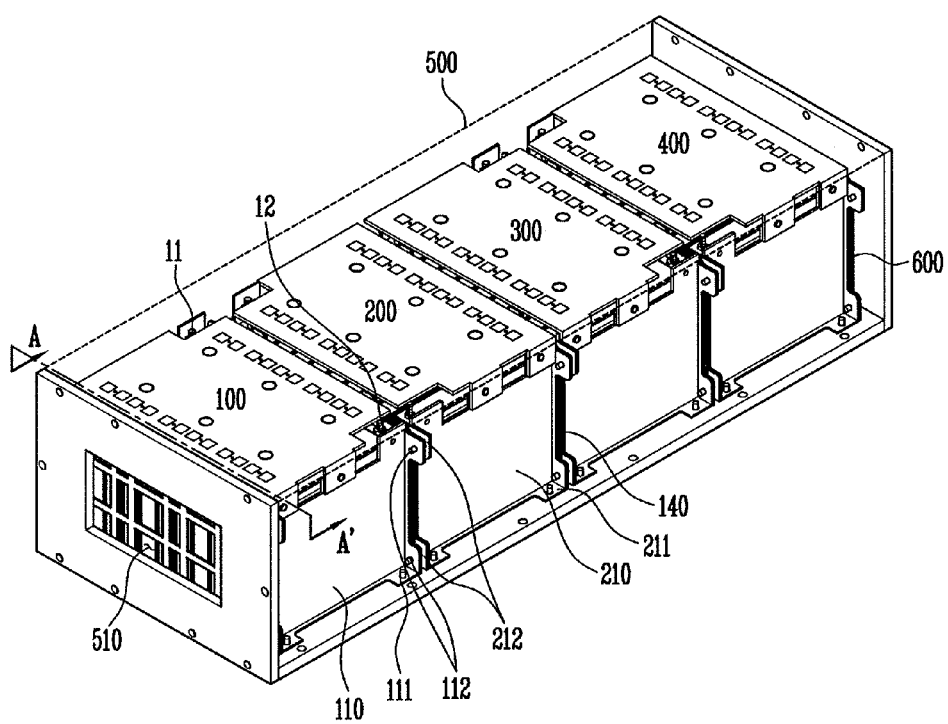
FIG. 1 illustrates a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
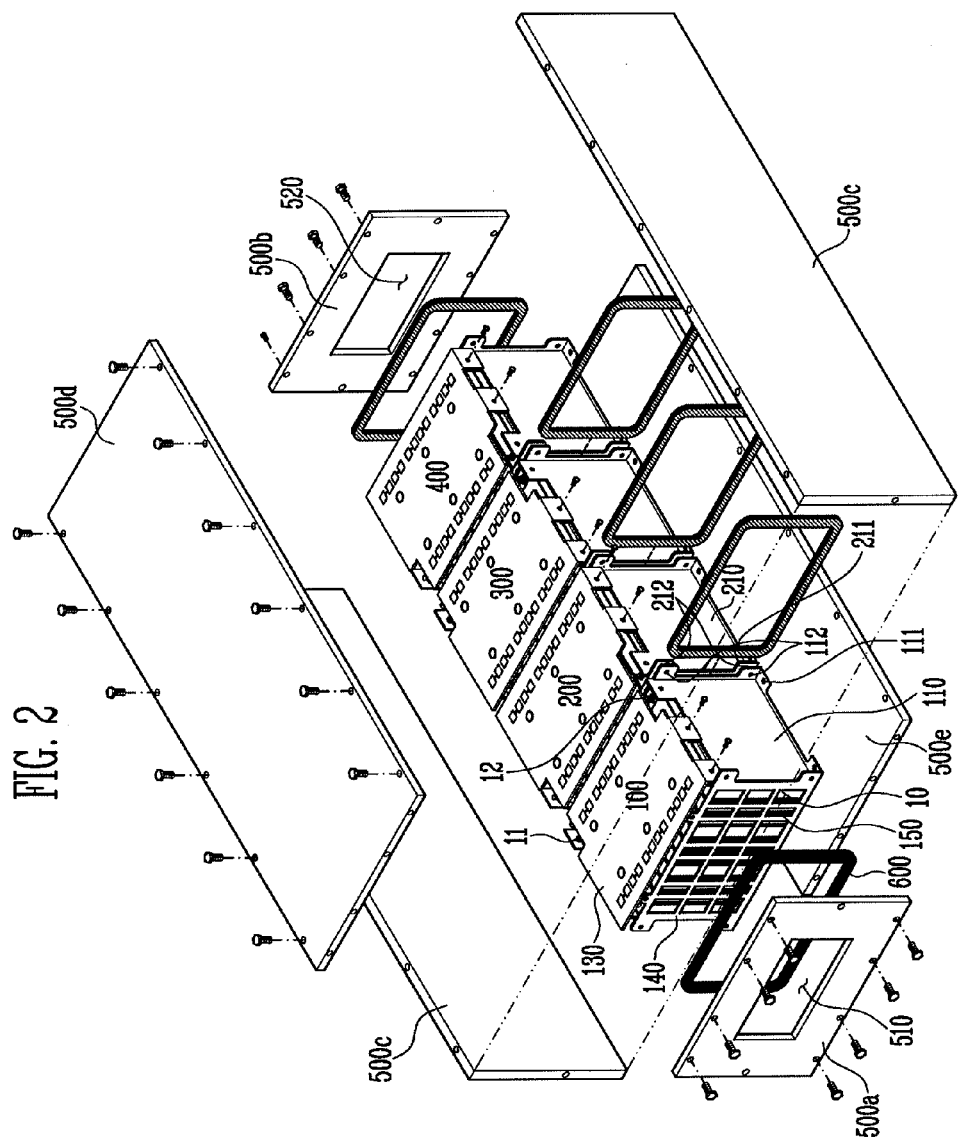
FIG. 2 illustrates an exploded perspective view of the battery pack according to the embodiment.

FIG. 1 illustrates a perspective view of a battery pack according to an embodiment. FIG. 2 illustrates an exploded perspective view of the battery pack according to the embodiment.

Referring to FIGS. 1 and 2, the battery pack according to this embodiment may include a plurality of battery modules 100, 200, 300, and 400, and a housing 500 surrounding the battery modules. The housing 500 may have an inlet 510 and an outlet 520. Here, the inlet 510 may be formed in one surface 500a of the housing 500, which is opposite to one side surface 150 of the first battery module 100 positioned at one end portion of the housing 500, and the outlet 520 may be formed in the other surface 500b opposite to the inlet 510, i.e., the other surface 500b opposite to the other side surface of the fourth battery module 400. The battery pack may further include sealing members 600 respectively formed between the battery modules 100, 200, 300, and 400 inside the housing 500, between the inlet 510 and the first battery module 100, and between the outlet 520 and the fourth battery module 400.

The first battery module 100 may include a plurality of battery cells 10 arranged in one direction, end plates 110 respectively positioned at both ends of the plurality of battery cells 10, and a side frame 140 positioned at sides of the plurality of the battery cells 10. The first battery module 100 may be as described above and the second battery module 200 adjacent thereto may be disposed at a predetermined interval in the housing 500 so that the side surfaces of the battery cells 10 in the first battery module 100 and the second battery module 200 are opposite to each other. The second battery module 200 and the third battery module 300 adjacent thereto and the third battery module 300 and the fourth battery module 400 adjacent thereto may be disposed in the housing 500 so that the side surfaces of the battery cells 10 therein are opposite to each other.

The sealing members 600 may be formed along an edge portion of the side surface of each of the battery modules 100, 200, 300, and 400. In this case, side frames 140 may be formed on a side surface of each of the battery modules 100, 200, 300, and 400, and the sealing members 600 may be formed on the side frames 140. As described above, the sealing members 600 may be respectively formed between the battery modules 100, 200, 300, and 400, between the inlet 510 and the first battery module 100, and between the outlet 520 and the fourth battery module 400.

In an air-cooling type battery pack, the sealing members 600 may enable air supplied through the inlet 510 to be exhausted through the outlet 520 by passing through the inside of each of the battery modules 100, 200, 300, and 400. Accordingly, the flow of air may be induced to flow inside each of the battery modules 100, 200, 300, and 400, and thus the cooling efficiency of the battery pack may be further improved.

The sealing members 600 may be formed of a sponge or a rubber. For example, the sealing members 600 may be formed of ethylene propylene diene monomer (EPDM) rubber. The EPDM is a thermoplastic synthetic rubber obtained by copolymerizing ethylene, propylene, and a diene. Unlike other synthetic rubbers, the thermoplastic synthetic rubber may be formed into a structure having no butadiene structure. Accordingly, the thermoplastic synthetic rubber may have an excellent weather resistance and electrical insulation property as compared with other synthetic rubbers.

The sealing members 600 may be formed to have a density of about 0.05 g/cm$^3$ to about 0.2 g/cm$^3$. If the density of the sealing members 600 is within the above-described range, air supplied from the inlet 510 may be controlled to avoid the air coming out both end portions of each of the battery modules 100, 200, 300, and 400 and the sealing members 600 may have an elasticity that allows for a hermetic seal between the battery modules 100, 200, 300, and 400.

The sealing members 600 may be respectively formed between the battery modules 100, 200, 300, and 400, between the inlet 510 and the first battery module 100, and between the outlet 520 and the fourth battery module 400, and thus the flow of air supplied inside the housing 500 may be controlled. In other words, the sealing members 600 may separate the flow of air inside each of the battery modules 100, 200, 300, and 400 from the flow of air at both the end portions of each of the battery modules 100, 200, 300, and 400, and thus the air flowing in through the inlet 510 may pass through only the inside of each of the battery modules 100, 200, 300, and 400. Accordingly, the air for cooling may not flow into both the end portions of each of the battery modules 100, 200, 300, and 400, thereby further efficiently cooling the battery modules. While the sealing member 600 may prevent air from flowing into both end portions of each of the battery modules 100, 200, 300, and 400, the embodiments are not limited thereto (i.e., in an embodiment some air may flow into the end portions of one or more of the battery modules).

Hereinafter, the battery module will be described in greater detail, using the first battery module 100 as an example.

The first battery module 100 may be formed by arranging a plurality of cells 10 in one direction. The battery cell 10 may be manufactured by accommodating an electrode assembly and an electrolyte in a case and then sealing the case with a cap plate. A positive electrode terminal 11, a negative electrode terminal 12, and a vent provided between the terminals 11 and 12 may be formed on the cap plate. The electrode assembly may include a positive electrode plate, a negative electrode plate and a separator interposed between these electrode plates. Here, the positive and negative electrode plates may be connected to the respective positive and negative electrode terminals 11 and 12, so that energy generated by an electrochemical reaction between the electrode assembly and the electrolyte is provided outside the battery cell 10. The vent may act as a passage along which gas generated inside the battery cell 10 may be exhausted outside the battery cell 10.

The battery cells 10 may be arranged in parallel so that wide front surfaces of the battery cells 10 are opposite to each other. The positive and negative electrode terminals 11 and 12 of two adjacent battery cells 10 may be electrically connected to each other through a bus-bar. The bus-bar may have holes through which the positive and negative electrode terminals 11 and 12 can pass, respectively. The bus-bar through which the terminals 11 and 12 are connected to each other by passing may be fixed by a member such as a nut.

A pair of end plates 110 may be respectively formed at both ends of the plurality of battery cells 10. A top frame 130 may be formed on tops of the plurality of battery cells 10, and a bottom frame may be formed on bottoms of the plurality of battery cells 10. A side frame 140 may be formed on side surfaces of the plurality of battery cells 10.

The pair of end plates 110 may be disposed to come in surface contact with the respective outermost battery cells 10, and thus may pressurize the plurality of battery cells 10 inward (e.g., toward the center of the stack of battery cells 10 within the battery module 100). In this case, the positive and negative electrode terminals 11 and 12 of the plurality of battery cells 10 supported by the pair of end plates 110, the top frame 130, the bottom frame and the side frame 140 may be alternately arranged, and thus the plurality of battery cells 10 may be connected in series to one another.

Each of the battery modules 100, 200, 300, and 400 formed as described above may be accommodated in the housing 500, and may be connected to the battery module adjacent thereto by a fastening member.

Side portions of each of the end plates 110 respectively positioned at both of the ends of the first battery module 100 may be vertically bent, and a side fastening portion 112 may be formed at each side portion. The side fastening portion 112 of the first battery module 100 may be fastened to the side frame 140 by a fastening member. Also, side portions of each of the end plates 110 respectively positioned at both the ends of the second battery module 200 may be vertically bent, and a side fastening portion 212 may be formed at each side portion. In the third and fourth battery modules 300 and 400, the end plate 110 and the side frame 140 may be fastened to each other in the structure described above.

Each of the battery modules 100, 200, 300, and 400 described above may be inserted and fixed to the housing 500. In this case, each of the battery modules 100, 200, 300, and 400 may be fastened and fixed to a bottom surface 500e of the housing 500. The housing 500 may also include side surfaces 500c and a top surface 500d. For example, in the first and second battery modules 100 and 200, the lower portion of the end plate 110 or 210 may include a bottom fastening portion 111 or 211 vertically bent to be formed in parallel with the bottom surface 500e of the housing 500. Accordingly, the bottom fastening portions 111 and 211 of the first and second battery modules 111 and 211 may be fixed to the bottom surface 500e of the housing 500 by a fastening member. Here, the fastening member may include, e.g., a bolt or a stud.

Figure 3:
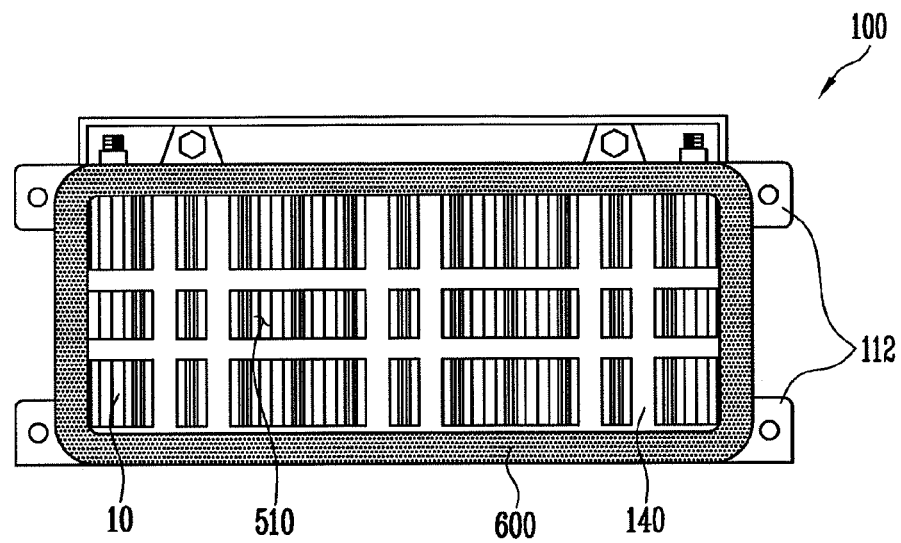
FIG. 3 illustrates a sectional view taken along line A-A' of FIG. 1.

FIG. 3 illustrates a sectional view taken along line A-A' of FIG. 1.

Referring to FIG. 3, the side frame 140 may be formed on the side surface of the first battery module 100 opposite to one surface of the housing 500 (see FIG. 2) having the inlet 510 (see FIG. 2) formed therein. The side frame 140 may surround at least the edge portion of the side surface of the first battery module 100, and the sealing member 600 may be formed along an edge portion of the side frame 140. The sealing member 600 may be formed of a sponge or a rubber material. The sealing member 600 may be formed to a predetermined thickness so that the size of the battery pack should not be increased.

If the sealing member 600 is formed along the edge portion of the side frame 140, the sealing member 600 may function to spatially separate the inside of the first battery module 100 from both the end portions of the first battery module 100. That is, the sealing member 600 may enable the air supplied inside the first battery module 100 through the inlet 510 to not flow into both the end portions of the battery module 100.

The sealing members 600 may be respectively formed between the battery modules 100, 200, 300, and 400 (see FIG. 2), between the inlet 510 and the first battery module 100, and between the outlet 520 (see FIG. 2) and the fourth battery module 400. Accordingly, the air supplied from the inlet 510 may pass through the inside of each of the battery modules 100, 200, 300, and 400 (see FIG. 2), thereby cooling the battery pack.

Figure 4:
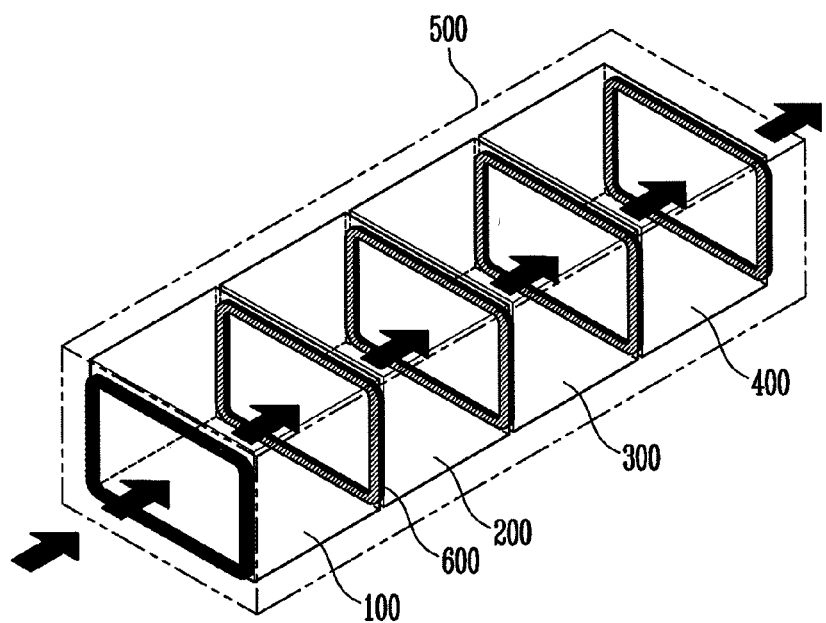
FIG. 4 illustrates a schematic view showing the flow of air according to the embodiment.

FIG. 4 illustrates a schematic view showing the flow of air according to an embodiment.

Referring to FIG. 4, in the battery pack according to this embodiment, the four battery modules 100, 200, 300, and 400 may be positioned inside the housing 500. The battery modules 100, 200, 300, and 400 may be arranged so that the side surfaces of the battery modules 100, 200, 300, and 400 are opposite to each other. The sealing members 600 may be respectively formed between the battery modules 100, 200, 300, and 400 (see FIG. 2), between the inlet 510 and the first battery module 100, and between the outlet 520 (see FIG. 2) and the fourth battery module 400.

The sealing members 600 may be formed so that the middle region except the edge portion is penetrated (e.g., so that the sealing members 600 includes a hole). Thus, the sealing members 600 may be positioned at the edge portion of the side surface of each of the battery modules 100, 200, 300, and 400. Accordingly, the air supplied from the inlet 510 (see FIG. 2) of the housing 500 may flow inside the first battery module 100, and may not flow into both the end portions of the first battery module 100 by the sealing member 600. The air passing through the first battery module 100 may move toward the second battery module 200. In this case, the sealing member 600 may also be formed at the edge portion between the side surfaces of the first and second battery modules 100 and 200, and thus the air may flow in only the inside of the second battery module 200.

As such, the air flowing through the second battery module 200 may be exhausted through the outlet 520 (see FIG. 2) by passing through the inside of each of the third and fourth battery modules 300 and 400. Here, the sealing member 600 may also be formed between the fourth battery module 400 and the outlet 520, and thus the entire air flowing through the inlet 510 may be exhausted through the outlet 520 without moving to both the end portions of the fourth battery module 400.

Accordingly, the sealing members may control the air supplied for cooling the battery pack to flow in only the inside of each of the battery modules 100, 200, 300, and 400, and thus may improve the cooling efficiency of the battery pack.

Figure 5:
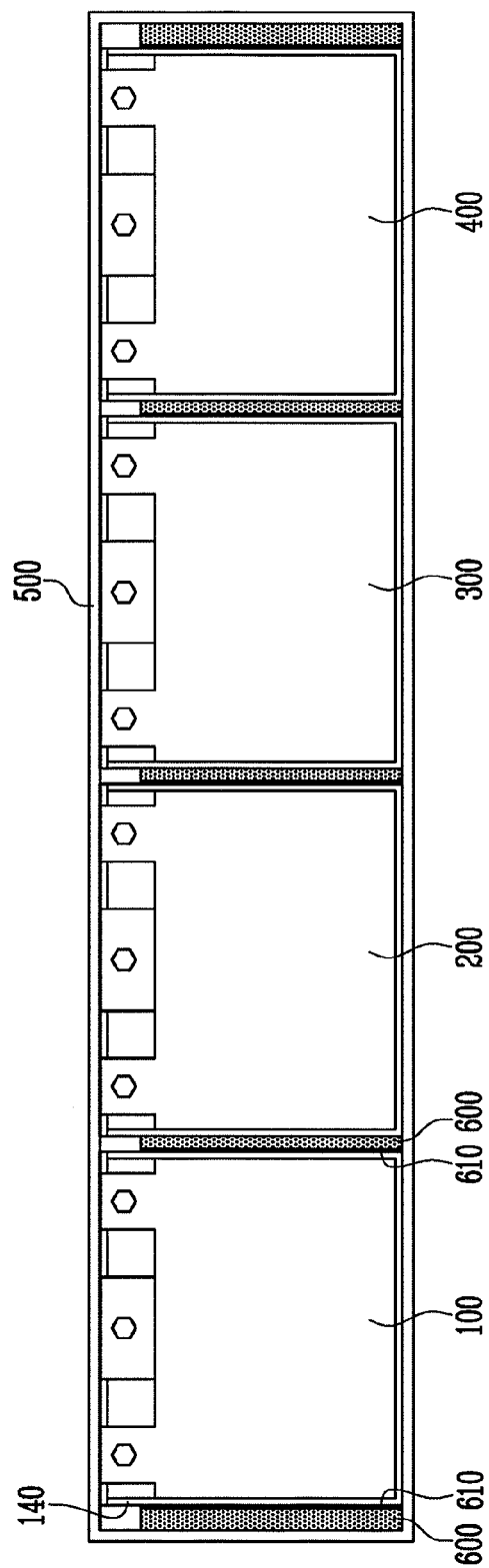
FIG. 5 illustrates a side view showing the inside of a housing of the battery pack according to the embodiment.

FIG. 5 illustrates a side view showing the inside of a housing of the battery pack according to an embodiment.

Referring to FIG. 5, the sealing members 600 may be respectively formed between the battery modules 100, 200, 300, and 400, between the inlet 510 and the first battery module 100, and between the outlet 520 (see FIG. 4) and the fourth battery module 400.

In this case, each of the sealing members 600 positioned between the battery modules 100, 200, 300, and 400 may be adhered to one battery module and compressed by another battery module (e.g., compressed between adjacent battery modules). For example, the sealing member 600 positioned between the first and second battery modules 100 and 200 may be adhered to the first battery module 100 by a double-faced tape or an adhesive 610, and may maintain a state in which the sealing member 600 is compressed by the second battery module 200.

The sealing member 600 positioned between the inlet 510 and the first battery module 100 may be adhered to the first battery module 100, and may maintain a state in which the sealing member 600 is compressed by the one surface of the housing 500 having the inlet 510 formed therein. The sealing member 600 positioned between the outlet 520 and the fourth battery module 400 may be adhered to the fourth battery module 400, and may maintain a state in which the sealing member 600 is compressed by the other surface of the housing 500 having the outlet 520 formed therein.

Figure 6A:
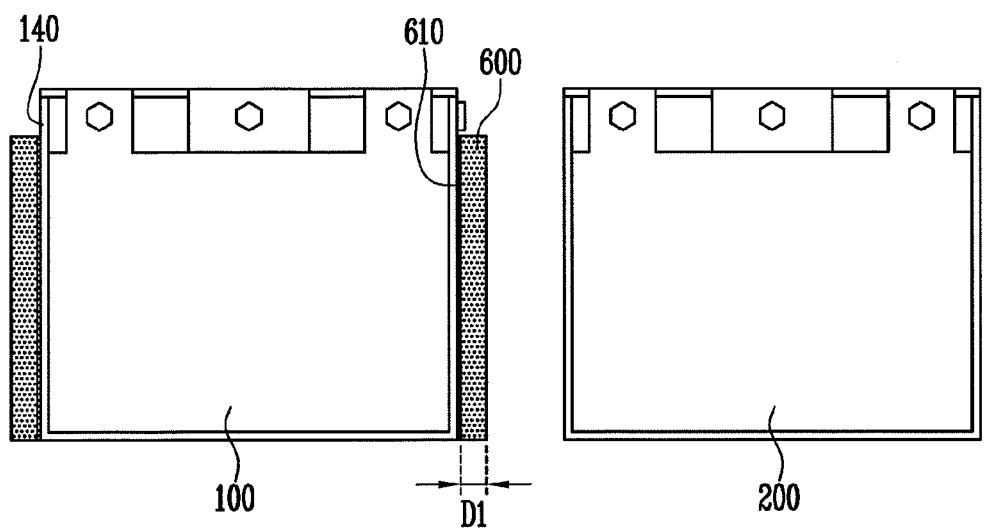
FIG. 6A illustrates a view showing a state before a sealing member is compressed according to the embodiment.
Figure 6B:
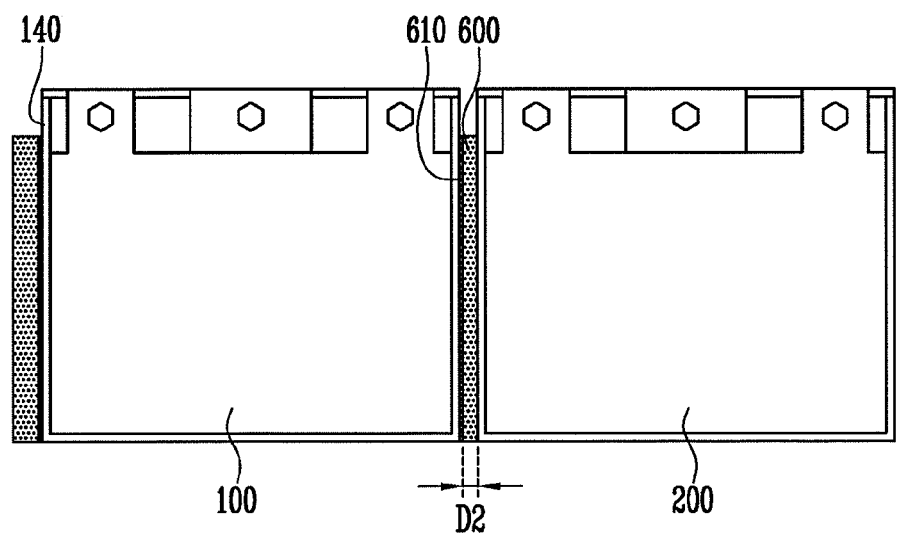
FIG. 6B illustrates a view showing a state after the sealing member is compressed according to the embodiment.

FIG. 6A illustrates a view showing a state before the sealing member is compressed according to an embodiment. FIG. 6B is a view showing a state after the sealing member is compressed according to an embodiment.

Referring to FIGS. 6A and 6B, the sealing member 600 positioned between the first and second battery module 100 and 200 may be adhered to the first battery module 100 by an adhesive or a double-faced tape 610. The sealing member 600 adhered to the first battery module 100 may be formed of a sponge or a rubber, and thus may be compressed by the second battery module 200. For example, the sealing member 600 may be formed of EPDM rubber, etc., and may be formed to have a density of about 0.05 g/cm$^3$ to about 0.2 g/cm$^3$.

The volume of the sealing member 600 compressed by the second battery module 200 may be about 20% to about 50% of the volume of the sealing member 600 before the sealing member 600 is compressed. Accordingly, the thickness D1 of the sealing member 600 in the state in which the sealing member 600 is adhered to only the first battery module 100 may be thicker than the thickness D2 of the sealing member 600 in the state in which the sealing member 600 is compressed by the second battery module 200.

If the volume of the sealing member 600 compressed by the second battery module 200 is within the above-described range, the air passing through the first battery module 100 may be controlled so as not to flow into both the end portions of the second battery module 200 (e.g., to avoid degrading the cooling performance), and to avoid the sealing member made of the sponge or the rubber material being broken by being over-compressed. Therefore, the volume of the sealing members 600 in the compressed state may be maintained to be about 20% to about 50% of the volume of the sealing members 600 in the non-compressed state.

By way of summary and review, to achieve long-time driving and high-power driving for an electric vehicle, hybrid vehicle, or the like, which may have large power consumption, a large-capacity battery module may be configured by electrically connecting a plurality of battery cells so as to increase power and capacity. The battery module may increase output voltage or current according to the number of battery cells built therein and a battery pack may be configured by electrically connecting a plurality of battery modules. However, the high-power, large-capacity battery pack may have a problem in that a large amount of heat may be generated in the charging/discharging process of the battery pack. Therefore, it may be beneficial for the battery pack to be able to easily dissipate heat generated from each battery cell by providing the high-power, large capacity battery pack with a cooling system.

The battery pack according to the embodiments may allow for improved cooling efficiency to better dissipate heat generated from each battery cell. In a cooling system, a cooling medium such as air may flow through one side of the battery pack and be discharged through the other side of the battery pack, thereby lowering the temperature inside the battery pack. As described above, sealing members may be adhered between battery modules, and thus the flow of air for cooling the battery pack may be directed towards the inside of the battery modules without flowing into both the end portions of each battery module, thereby improving cooling efficiency.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, the battery pack comprising:
   at least one battery module having a plurality of battery cells arranged in one direction, the plurality of battery cells in the at least one battery module being electrically connected to one another;
   a housing surrounding the at least one battery module, the housing including:
      an inlet in a first surface of the housing, the first surface being opposite to a side surface of a battery module at one end of the housing, and
      an outlet in a second surface of the housing, the second surface being opposite to the inlet; and
   a first sealing member that extends along an entire perimeter of an edge portion of the side surface of the battery module at the one end of the housing, the first sealing member having an opening therethrough, wherein:
      the first sealing member is between the first surface of the housing and a battery module, the inlet and the outlet of the housing facing the opening in the first sealing member,
      the first sealing member is compressed, a volume of the compressed first sealing member being about 20% to about 50% of the volume of the first sealing member before the first sealing member is compressed,
      the battery module at the one end of the housing includes a side frame on the side surface thereof, and the first sealing member is only on a perimeter of the side frame,
      the first sealing member is between the first surface of the housing having the inlet and the battery module at the one end of the housing,
      a second sealing member is between adjacent battery modules, and
      a third sealing member is between the second surface of the housing having the outlet and a battery module at a second end of the housing that is opposite to the one end of the housing.

2. The battery pack as claimed in claim 1, wherein the second sealing member is adhered to a first battery module and is compressed by a second battery module.

3. The battery pack as claimed in claim 2, wherein the second sealing member is adhered to the first battery module by an adhesive or a double-faced tape.

4. The battery pack as claimed in claim 2, wherein a volume of the second sealing member compressed by the second battery module is about 20% to about 50% of the volume of the second sealing member before the second sealing member is compressed.

5. The battery pack as claimed in claim 1, wherein:
   the first sealing member is adhered to the battery module at the one end of the housing and is compressed by the first surface of the housing, or
   the third sealing member is adhered to the battery module at the second end of the housing and is compressed by the second surface of the housing.

6. The battery pack as claimed in claim 5, wherein:
the first sealing member is adhered to the battery module at the one end of the housing by an adhesive or a double-faced tape, or
the third sealing member is adhered to the battery module at the second end of the housing by an adhesive or a double-faced tape.

7. The battery pack as claimed in claim 5, wherein:
a volume of the third sealing member compressed by the second surface of the housing is about 20% to about 50% of the volume of the third sealing member before the third sealing member is compressed.

8. The battery pack as claimed in claim 1, wherein:
the outlet is in flow communication with the inlet via a flow path, and
the inlet, the first sealing member, the second sealing member, the third sealing member, and the outlet are disposed sequentially along the flow path such that air can flow through the housing along the flow path, the flow path passing through respective openings in the first, second, and third sealing members.

9. The battery pack as claimed in claim 1, wherein the first sealing member includes a sponge or a rubber.

10. The battery pack as claimed in claim 9, wherein the first sealing member includes ethylene propylene diene monomer rubber.

11. The battery pack as claimed in claim 1, wherein the first sealing member has a density of about 0.05 g/cm$^3$ to about 0.2 g/cm$^3$.

12. The battery pack as claimed in claim 1, wherein:
the outlet is in flow communication with the inlet via a flow path, and
the inlet, the first sealing member, and the outlet are disposed sequentially along the flow path such that air can flow through the housing along the flow path, the flow path passing through the openings in the first sealing member.

13. The battery pack as claimed in claim 12, wherein the flow path allows air to pass through the side surface of the battery module at the one end of the housing.

14. The battery pack as claimed in claim 13, wherein:
the at least one battery module includes a plurality of battery modules, and
the flow path allows air to pass through each of the battery modules.

15. The battery pack as claimed in claim 1, wherein:
the outlet is in flow communication with the inlet via a flow path,
the at least one battery module includes a plurality of battery modules,
each of the plurality of battery modules have a plurality of battery cells arranged in the one direction,
the plurality of battery modules are arranged in a second direction that is perpendicular to the one direction, and
the flow path allows a medium to flow through openings in the first, second, and third sealing members the battery modules in the second direction.

16. The battery pack as claimed in claim 1, wherein the outlet is in flow communication with the inlet via a flow path, the flow path passing through openings in the first, second, and third sealing members.

* * * * *